United States Patent Office 2,694,700
Patented Nov. 16, 1954

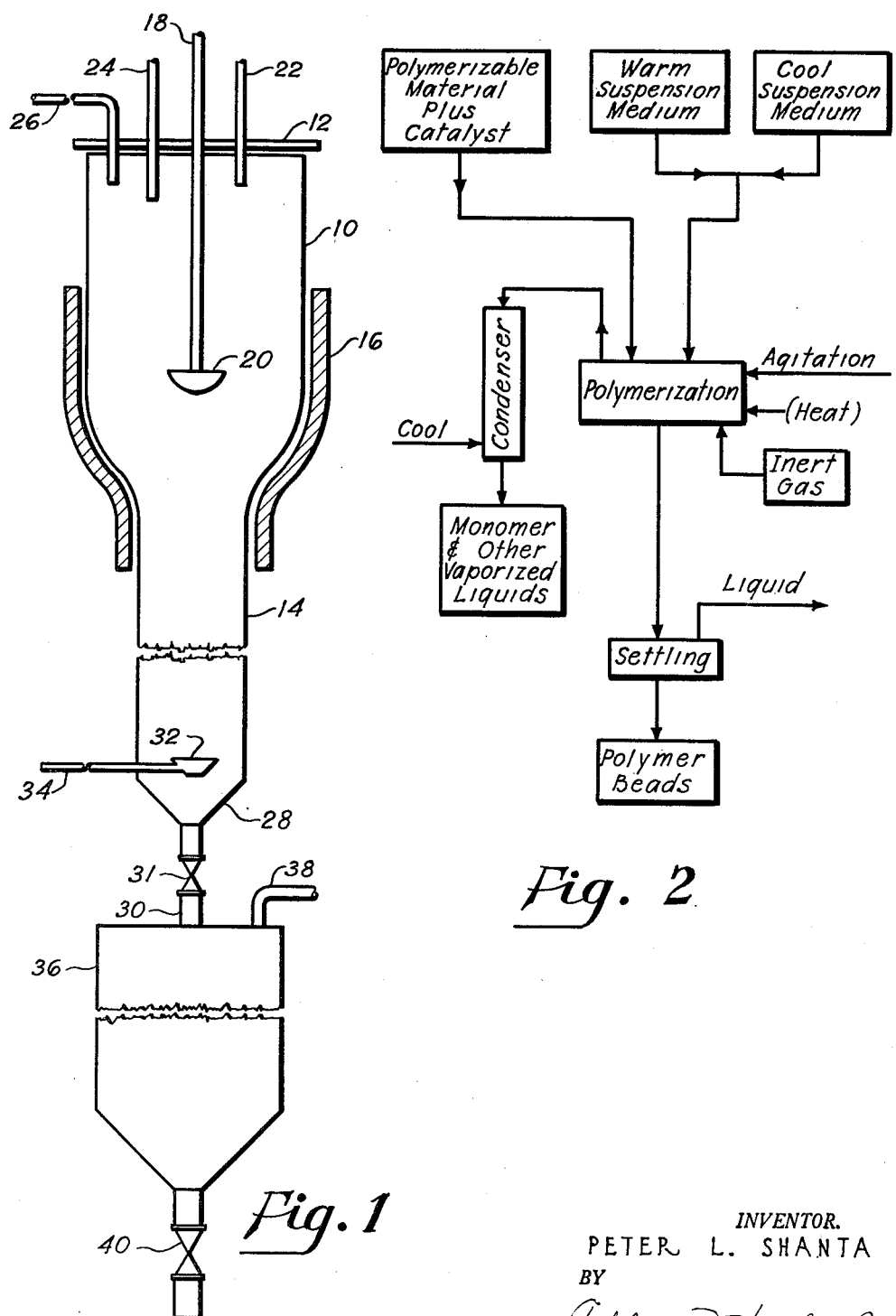

2,694,700

PROCESS OF SUSPENSION POLYMERIZATION

Peter L. Shanta, Niagara Falls, N. Y.

Application January 21, 1950, Serial No. 139,801

3 Claims. (Cl. 260—88.7)

The invention of this application relates to the continuous polymerization of vinyl compounds and particularly to the continuous production of discrete, unagglomerated beads or "pearls" of polymers of such compounds.

Hitherto monomers of vinyl compounds, such, for example, as styrene, have been polymerized in a number of ways. For many purposes the globular polymer product resulting from so-called suspension polymerization is preferred. In suspension polymerization a monomer is dispersed as small globules by mechanical agitation in a nonsolvent liquid suspension medium. The globules are maintained suspended in dispersed condition during the progress of the polymerization reaction by a stabilizer or dispersant in the suspension medium. The product obtained is in the form of substantially spherical beads, sometimes called "pearls," which are quite pure, of rather uniform size, easily handled, and very desirable for molding purposes. Prior to the present invention, no method had, however, been devised for the continuous suspension polymerization of styrene and numerous other vinyl compounds and only discontinuous, batch methods have up to now been employed for their polymerization in suspension.

By the present invention there is provided a novel and highly efficient method for the continuous suspension polymerization of such compounds and apparatus suitable for carrying out the novel method is described herein.

In the accompanying drawings:

Figure 1 is a diagrammatic view of one form of apparatus which may be employed in continuous suspension polymerization according to the present invention; and Figure 2 is a flow sheet illustrating diagrammatically the polymerization process of the present invention.

The process of the present invention is particularly applicable to those polymerizable vinyl compounds the polymers of which are soluble in their respective monomers and the monomers of which are at least relatively insoluble in the suspension medium. Among such compounds are, by way of example, styrene, dichlorostyrene, methyl methacrylate, acrylonitrile and vinyl acetate. The process is also adaptable to the formation of copolymers of such compounds with each other and with other polymerizable materials.

It has been found that when a vinyl compound of the class mentioned, containing a proper catalyst dissolved therein, is agitated in a nonsolvent liquid, which preferably contains a dissolved or colloidally dispersed suspending agent or dispersant, there are formed globules or droplets of the polymerizable material that can be kept in suspension in the suspension medium and converted to a polymer by heating while so suspended. If the agitation and heating are carried out in a system in which the beads can settle out as they become polymerized to the point where they are of greater specific gravity than the suspension medium, and in which the suspension medium is continuously withdrawn at a rate so related to the infeed of polymerizable material and suspension medium as to maintain the fluid level in the system substantially constant, there is obtained continuous production of beads or pearls of polymer.

The flow sheet shown by Figure 2 of the accompanying drawings illustrates diagrammatically the operation of the process of the present invention. In Figure 1 there is shown, diagrammatically, apparatus suitable for carrying out applicant's novel process although it will be apparent that other apparatus may be employed.

The apparatus illustrated in Figure 1 comprises a reaction vessel 10, which is preferably cylindrical and of greater height than diameter, having a cover 12 and a lower extension 14 of reduced diameter. A heating coil or mantle 16 is positioned around the lower portion of the reaction vessel 10. The cover 12 is provided with a centrally located port through which there extends a stirrer 18 comprising a rod 19 equipped at its lower end with a stirring blade 20. There are also provided in the cover 12 holes or ports accommodating the tubes or pipes 22, 24 and 26 which are intended, respectively, for the entrance of a liquid suspension medium, the entrance of a liquid polymerizable material, and the withdrawal of gases and vapors from the upper portion of the vessel 10 for passage through a condenser (not shown).

The elongated and reduced lower portion 14 of the reaction vessel 10 is preferably provided adjacent its lower end with an inwardly tapering wall 28 and a restricted outlet 30 which may, if desired, be provided with a closure such as a valve 31. A porous diffusion disc 32, preferably of ceramic material, is supported centrally of the extension 14 adjacent the bottom thereof and is adapted to be connected by a tube 34, passing through the side wall of the extension, with a source (not shown) of inert gas.

The outlet 30 of the reaction vessel 10 communicates with a settling chamber 36. A discharge pipe or line 38 is connected to the chamber 36 adjacent the top thereof to permit withdrawal of the suspension medium. At its lower end the settling chamber is provided with a valved outlet 40 through which there may be drawn off the beads or pearls of polymer which collect at the bottom thereof.

In the following examples the process of the present invention will be illustrated as applied to the polymerization of vinyl compounds of the type hereinbefore referred to in apparatus of the same general character as that just described.

*Example I*

An aqueous dispersion of bentonite was prepared which contained 2% of bentonite by weight. The polymerization apparatus was filled to the desired level (usually about three-fourths of capacity) with the dispersion which was used as a suspension medium and heat was supplied to the reaction vessel 10 from the coil or mantle 16. Circulation and agitation of the aqueous medium was ensured by operation of the stirrer 18 and by the admission of nitrogen, a gas inert so far as the polymerization is concerned, to the vessel through the tube 34 and the diffuser 32. Bubbling nitrogen through the aqueous dispersion is further beneficial since it serves to deaerate it and thus obviate inhibition of the polymerization reaction by the oxygen of the air.

When the suspension medium in the vessel 10 reached a temperature of 80° C., additional bentonite dispersion was admitted at a constant rate through the tube 22 and styrene was fed in at a slow even rate through the inlet tube 24. The styrene had previously been thoroughly admixed with 2% of benzoyl peroxide as a polymerization catalyst. The styrene was broken up by the stirrer 18 into small globules which were suspended in and continued to circulate in the vessel 10 until they became polymerized sufficiently to settle to the bottom of the reaction vessel 10 and pass through the outlet 30 into the settling chamber 36. The beads or pearls of polymerized styrene began to settle out in a few hours and were found to have an average diameter of less than 0.5 mm.

The polymerization reaction is an exothermic one. Regulation of the temperature in the reaction vessel is therefore necessary to prevent the temperature from rising too much. Excessive cooling is, however, also to be avoided. Since the suspension medium is being constantly withdrawn and replenished during the reaction, such regulation may conveniently be provided by controlling the temperature of the suspension medium fed into the reaction vessel. It is preferred to do this by providing two sources of suspension medium, one cold and the other at a higher temperature, which may be introduced singly or together into the line running to the reaction vessel. By such an arrangement the temperature in the system may be kept constant, cooler suspension medium being fed in when the temperature shows a tendency to rise and warmer suspension medium being introduced if the temperature starts to fall. Suitable controls can, of course, be arranged by those skilled in the art which will make the temperature regulation automatic. In the present example the temperature in the system was maintained at approximately 80° C. during the polymerization.

The nitrogen and any other gases or vapors in the reaction vessel 10 including a small amount of vaporized styrene monomer were withdrawn through the tube or pipe 26 and passed through a condenser of suitable type which separated the water and vaporized styrene from the nitrogen and other gases. The styrene was recovered, mixed with catalyst, and returned to the feed. The aqueous suspension medium was withdrawn from the settling vessel at a relatively constant rate which was adjusted from time to time so as to maintain the desired liquid level in the apparatus.

It will be appreciated that there may be considerable variation in the manner by which the novel process of the present invention is carried out and in the processing materials employed. Thus the aqueous bentonite dispersion used as a suspension medium in the foregoing example may be substituted by aqueous solutions or colloidal dispersions of other stabilizers or dispersants such, for example, as gelatine, pectin, polyvinyl alcohol, methyl cellulose, carboxymethyl cellulose, alginates, starch, and the water soluble adduct of maleic anhydride and styrene. With the bodied polymerizable materials hereinafter described and where non-aqueous dispersion media are employed, a dispersant or stabilizer will in many cases be unnecessary.

In general the proportion or concentration of stabilizer or dispersant required in the suspension medium will be very small. Where required, a concentration in the suspension medium of from .05% to 2.0% of those named above will be found sufficient. It is advisable to avoid types or concentrations of stabilizers and dispersants which favor or promote emulsification since it is desired to obtain as little as possible of the polymerizable material in the form of an emulsion. The beads or pearls of polymer which settle out require for most purposes no cleaning treatment other than washing. For some uses, however, it may be desirable to employ a mild rubbing treatment to ensure removal of the small amounts of suspension medium which may remain on the surfaces of the pearls.

Although a number of inert gases can be employed in the process of the present invention for deaeration of the system and agitation of its contents, nitrogen is entirely satisfactory and because of its cheapness and incombustibility has been found most convenient. The rate of flow of the nitrogen is not critical but should be adjusted to produce the desired degree of turbulence in the reaction chamber.

A polymerization catalyst is preferred that is soluble in the monomer of the polymerizable material used and is also, preferably, insoluble in the suspension medium. Besides benzoyl peroxide there may be employed other known polymerization catalysts such as acetyl benzoyl peroxide, diacetyl peroxide, and various other per-compounds which meet the above-mentioned requirements. The catalyst concentration may vary between about 0.25% and 2.0% although it has been found that an amount within the range from 0.75% to 1.25% is satisfactory in most cases. Lower concentrations tend to unduly prolong the initial retention time, i. e. the period required for the beads from the first polymerizable material fed into the system to polymerize and settle, while higher concentrations shorten the initial retention time but make it difficult to obtain a product which is polymerized to a molecular weight within the generally desired range.

Although the monomer of a polymerizable vinyl compound fed into the polymerization apparatus is broken up into globules or droplets and dispersed in the suspension medium by the stirrer, and the bubbles of nitrogen rising through the reaction vessel serve as baffles that hinder to some extent coalescence of the droplets until the globules polymerize, it has been found preferable to body the monomer prior to its introduction into the reaction vessel by the addition thereto of a substantial amount of its polymer. This results in an increase in the viscosity of the feed and reduction in the tendency of the globules to coalesce.

Such bodying may be accomplished by dissolving polymer in the monomer or by polymerizing a portion of the monomer which is to be used as feed. The latter method which may be called prepolymerization may conveniently be carried out in a continuous bulk polymerizer of the German type like that described in the book German Plastics Practice by De Bell, Goggin and Gloor (De Bell and Richardson, 1946). However, any other known or desired procedure may be employed.

The polymerizable vinyl compound feed may be bodied to any extent desired or economically feasible up to the point where it becomes too viscous to flow into the polymerization apparatus; but it has been found that, in general, an absolute viscosity at the feed temperature of the order of 500 poises is productive of good results. The use of feed materials with substantially lower viscosities is not unlikely to result in considerable coalescing of the globules in the reaction vessel while feeds having higher viscosities are difficult to handle.

Bodying the feed prior to use also results, other conditions being the same, in reduction in the initial retention time. This follows from the fact that the globules formed in the reaction vessel from bodied polymerizable materials already contain some polymer. It will be understood that the state of the polymer employed to body the feed, i. e. its molecular weight, as well as the amount of polymer used will affect the viscosity of the feed.

In the following examples, the polymerization of bodied vinyl compounds is illustrated:

Example II

A suspension medium consisting of an aqueous solution containing 0.05% of polyvinyl alcohol by weight was prepared and the polymerization apparatus was filled to the desired level with the solution. The suspension medium in the reaction vessel was then heated by the coil or mantle 16 while being stirred and deaerated by the stirrer 18 and bubbles of nitrogen introduced through the diffuser 32.

When the solution in the vessel 10 reached a temperature of 85° C., additional polyvinyl alcohol solution and styrene, the latter being bodied by the addition of polystyrene and having an absolute viscosity of 500 poises, were admitted to the reaction vessel while continuing the stirring and the flow of nitrogen. The bodied styrene feed to the reaction vessel contained 1.0% benzoyl peroxide. Throughout the polymerization, the temperature of the materials in the reaction vessel was maintained at approximately 85° C.

As in Example I, the styrene and polyvinyl alcohol solution suspension medium were admitted at constant rates and the latter was withdrawn at such a rate as to maintain the desired liquid level in the polymerization apparatus. The droplets of the bodied styrene feed dispersed in the aqueous suspension medium by the action of the stirrer 18 being more viscous than unpolymerized styrene, showed less tendency to coalesce with each other than in the preceding example; and, being partially converted from the monomer state, were polymerized more rapidly than the globules in Example I. The first polymerized pearls or beads settled out in a few hours. The product obtained consisted of beads of an average diameter of between 2.5 mm. and 2.7 mm.

Example III

In another run, carried out substantially identically with the run described in Example II except that a column temperature of about 65° C. was maintained during the polymerization reaction, although the initial retention time was increased, the beads or pearls of the polymerized product had an average diameter between 1.5 and 1.7 mm.

Example IV

Styrene, bodied by prepolymerization to an absolute viscosity of 500 poises, was polymerized in substantially the same manner as in Example II, but with a catalyst content of 1.25% in the bodied feed to the reaction vessel and with the temperature in the polymerization apparatus being maintained throughout the run at approximately 75° C. The run produced beads or pearls of polystyrene having an average diameter between 2.6 mm. and 2.8 mm. The initial retention time was greatly reduced from that in the preceding example.

Example V

Following the same procedure as in Example II but using styrene which had been bodied by prepolymerization to an absolute viscosity somewhat in excess of 500 poises, a column temperature throughout the run of about 75° C. and water containing no dispersant as the suspension medium resulted in the production of polystyrene beads having an average diameter between 3.1 mm. and 3.3 mm.

Example VI

Pearls of polymerized methyl methacrylate were obtained by the use of an aqueous suspension medium in which the dispersant or stabilizer was gelatine in a concentration of 0.1%. As in the preceding examples, the polymerization apparatus was filled with the suspension medium which was then brought to the desired reaction temperature while being stirred and deaerated.

When a temperature of 50° C. was reached in the reaction vessel flow of additional gelatine solution through the apparatus was started and feed of polymerizable material which consisted of methyl methacrylate that had been bodied to have a rather high viscosity was begun. The methyl methacrylate feed contained 1.0% of benzoyl peroxide in solution. The stirring and the flow of nitrogen were continued throughout the polymerization and the temperature of the reaction vessel was maintained at approximately 50° C. by supplying warm or cool dispersion medium as necessary. The bodied feed material and the suspension medium were, as in the preceding examples, admitted at a constant rate and the desired liquid level in the polymerization apparatus was maintained by varying as necessary the rate of withdrawal of the suspension medium.

The first beads or pearls of polymerized methyl methacrylate settled out within a few hours and the beads were found to have an average diameter of less than 0.5 mm.

Example VII

Using apparatus of the type described above, vinyl acetate was polymerized by the continuous suspension process of the invention. The procedure was essentially the same as in the preceding examples. The suspension medium, however, consisted of an aqueous solution or dispersion of starch, the latter being present in a concentration of 0.5%. The reaction, because of the low boiling point of vinyl acetate was carried out at approximately 45° C. The vinyl acetate fed into the polymerization apparatus had been bodied by prepolymerization to form a liquid having an absolute viscosity between 450 and 500 poises and contained, in solution, 0.75% of benzoyl peroxide as a polymerization catalyst.

The beads of polymerized vinyl acetate obtained were of an average diameter of less than 0.5 mm. and the yield of polymer was good.

It may be noted here that since certain monomers of polymerizable vinyl compounds may be soluble in the suspension medium, as was the case with the vinyl acetate of the preceding example, the bodying of such monomers prior to use in the present process is particularly beneficial as the loss of the compound by solution in the suspension medium may thereby be reduced. Moreover, as previously pointed out, in the polymerization of other less soluble polymerizable vinyl compounds as well as in the polymerization of somewhat soluble ones bodying of the feed is advantageous since the droplets of feed circulating in the suspension medium do not coalesce as readily.

This has been demonstrated by an experiment in which a portion of a polymerizable feed, bodied to give it a high viscosity was colored red by a soluble dye prior to introduction into the reaction vessel. In the pearls of polymer recovered during the run there were found only a few beads which were not either colorless or of the same red tint as that of the colored feed. The fact that only a very few beads or pearls of polymer were found in which the red color of the feed was diluted is conclusive evidence that an insignificant number of globules or droplets of the viscous feed coalesced to form large drops which were then re-divided.

An additional benefit derived from the employment of feed material which has been bodied to increase its viscosity is that the initial retention time of the polymerizable material in the reaction vessel is reduced. It has been found that the initial retention time is also influenced by the temperature maintained in the polymerization apparatus and by the catalyst concentration employed. Increasing either the temperature or the catalyst concentration results in reducing the initial retention time and, in any particular apparatus, in raising the rate of production of polymer beads.

Polymerization temperatures up to or even above the boiling points of the monomers may be employed. It is desirable, however, to avoid excessive evaporation of monomer and temperatures somewhat below the boiling point are, therefore, generally preferred. Where the characteristics of the polymerizable material require it, the reaction vessel may be operated under pressure to minimize vaporization. It will be understood that the use of low polymerization temperatures is in general not desirable since the rate of polymerization is greatly reduced at low temperatures.

The rate at which the suspension medium is admitted to the reaction vessel during the polymerization is subject to considerable variation. In most cases its admission at a rate of about 5% to 10% of the volume of the apparatus per hour will be satisfactory. Higher rates are preferred in cases where there is a significant tendency for the polymerizable material to dissolve in or emulsify with the suspension medium since the presence with the globules of large concentrations of the polymerizable material in solution or emulsified in the suspension medium is undesirable.

It will be evident that the rate at which the polymerizable vinyl compounds should be fed into the reaction vessel will vary with the size of the apparatus, with the extent of polymerization desired, and with the initial retention time. Care should of course be taken to avoid such a high rate of feed as to promote coalescence of the droplets in suspension by crowding them together.

In carrying out the process of the present invention the stirrer provided in the apparatus serves two purposes. In the first place it mechanically breaks up the feed of polymerizable material into globules which are dispersed in the suspension medium; and secondly it creates agitation of turbulence in the reaction vessel which assists in suspending the globules until, by polymerization, they become of sufficiently high specific gravity to settle. The stirring should not be too vigorous, however, since violent stirring may either produce undesirably small beads and even emulsification or result in agglomeration of globules, or both.

The yields of beads or pearls of polymer from the process of the present invention are close to 100% of the polymerizable vinyl compounds fed into the reaction vessel. The only losses of these materials result from vaporization of the monomers and from their solution or emulsification in the suspension medium. As has been previously pointed out, the polymerizable vinyl compounds which are vaporized are withdrawn from the reaction vessel and recovered by condensation. Those compounds which are dissolved or emulsified in the suspension medium may also be recovered in any suitable way as by distillation or by polymerization and filtration.

When the polymerizable material which has been withdrawn from the reaction vessel in either of these ways is recovered, it may, after addition of catalyst, be returned to the feed if desired. It should be noted that it is undesirable to return the recovered monomer directly to the reaction vessel, for example, by the use of a reflux condenser. It is objectionable because the recovered monomer is devoid of catalyst and is also of very low viscosity. If, therefore, it were to be returned directly to the reaction vessel, it would upon contact with globules of the normal feed dissolve them sufficiently to render them gummy and prolong the time required for their polymerization.

The suspension medium may, if desired, be recirculated after the polymerizable material has been separated from it. However, care must be taken in such reuse of the suspension medium since there is a possibility that with continued recirculation the medium may come to contain an undesirably high concentration of impurities having an inhibiting effect upon the polymerization reaction.

As pointed out above, it is possible to color the beads or pearls of polymer by incorporating in the feed a suitable soluble dye. Not only may colored polymers be thus made, but there may also be incorporated in the polymerizable feed where desired suitable plasticizers, stabilizers, pigments, and similar adjuncts and modifiers such as are ordinarily used with plastic materials of the types with which this invention is concerned. The pearls of polymer obtained by operation of the process of the present invention are well suited for molding purposes and excellent results have been obtained in producing molded articles from them.

It will be perceived from the foregoing description that the novel process of the present invention is simple but highly efficient. The production of polymers by a continuous process is quite desirable and where, as here, the product is obtained in very pure form in a size convenient for molding without grinding or crushing, and is not in need of extensive treatment to remove contaminants mixed therewith during polymerization, it is of great value.

Where percentages are given in this specification and the attached claims it is to be understood that percentages by weight are meant. It is also to be understood that "continuous" as applied to the feed of the polymerizable material and the supply and withdrawal of suspension medium to and from the suspension in the system is intended to include intermittent addition and withdrawal as well as addition and withdrawal by constant flow.

It will be apparent that many variations and changes in addition to those described above may be made in carrying out the process of the present invention without departing from the spirit of the invention. It is intended, therefore, that the invention shall not be considered as limited to the precise process described herein or illustrated in the drawings, but that it shall be interpreted as broadly as permitted by the appended claims.

I claim:

1. In a process for continuous suspension polymerization, the steps which comprise continuously adding a normally liquid, catalyst-containing, polymerizable, vinyl compound to a liquid suspension medium in which said compound is substantially insoluble, mechanically dispersing said compound as globules in said medium to form a suspension, circulating said globules in a single vessel of said medium by agitation until said globules consist substantially wholly of polymer while continuously supplying and withdrawing suspension medium to and from said vessel, while maintaining said suspension at a temperature favorable to polymerization of said compound by controlling the temperature of the suspension medium supplied to said vessel, and while introducing bubbles of an inert gas into said vessel below the surface of said suspension, and separating globules of polymer which settle out of said suspension.

2. In a process for continuous suspension polymerization, the steps which comprise adding a polymerization catalyst to a monomer of a normally liquid vinyl compound, continuously adding said monomer to a liquid suspension medium in which said vinyl compound is substantially insoluble, mechanically dispersing said monomer as globules in said medium to form a suspension, circulating said globules in a single vessel of said medium by agitation while continuously supplying and withdrawing suspension medium to and from said vessel, while maintaining said suspension at a temperature favorable to polymerization of said monomer by controlling the temperature of the suspension medium supplied to said vessel, and while introducing bubbles of an inert gas into said vessel below the surface of said suspension, and separating polymerized globules which settle out of said suspension.

3. In a process for continuous suspension polymerization, the steps which comprise forming a liquid mixture of a monomer of a normally liquid vinyl compound and a polymer of said compound soluble in said monomer, adding a polymerization catalyst to said mixture, continuously adding said mixture to a liquid suspension medium in which said vinyl compound is substantially insoluble, mechanically dispersing said mixture as globules in said medium to form a suspension, circulating said globules in a single vessel of said medium by agitation while continuously supplying and withdrawing suspension medium to and from said vessel, while maintaining said suspension at a temperature favorable to polymerization of said monomer by controlling the temperature of the suspension medium supplied to said vessel, and while introducing bubbles of an inert gas into said vessel below the surface of said suspension, and separating substantially completely polymerized globules which settle out of said suspension.

References Cited in the file of this patent

UNITED STATES PATENTS

| Number | Name | Date |
|---|---|---|
| 2,326,326 | Breedis | Aug. 10, 1943 |
| 2,440,808 | Neher et al. | May 4, 1948 |
| 2,445,970 | Reinhardt | July 27, 1948 |
| 2,543,805 | Reinhardt | Mar. 6, 1951 |

FOREIGN PATENTS

| Number | Country | Date |
|---|---|---|
| 609,692 | Great Britain | Oct. 5, 1948 |